US006613430B2

(12) United States Patent
Culbertson et al.

(10) Patent No.: US 6,613,430 B2
(45) Date of Patent: Sep. 2, 2003

(54) RELEASE COATED POLYMER FILM

(75) Inventors: Edwin C. Culbertson, Greer, SC (US); Stephen J. Gust, Greenville, SC (US); Jan C. Westermeier, Taylors, SC (US); John M. Heberger, Greer, SC (US); Kenneth J. Muschelewicz, Easley, SC (US); Jeffrey R. Rounsley, Taylors, SC (US); Jose F. Alfaro, Chattanooga, TN (US)

(73) Assignee: Mitsubishi Polyester Film, LLC, Greer, SC (US)

( * ) Notice: Subject to any disclaimer, the term of this patent is extended or adjusted under 35 U.S.C. 154(b) by 0 days.

(21) Appl. No.: 09/945,865

(22) Filed: Sep. 4, 2001

(65) Prior Publication Data

US 2002/0058758 A1 May 16, 2002

Related U.S. Application Data

(60) Provisional application No. 60/230,652, filed on Sep. 7, 2000, and provisional application No. 60/249,605, filed on Nov. 17, 2000.

(51) Int. Cl.[7] ............................. B32B 15/04; B32B 7/12
(52) U.S. Cl. ...................... 428/352; 428/141; 428/143; 428/147; 428/337; 428/339; 428/343; 428/346; 428/347; 428/348; 428/349; 428/354; 428/446; 428/448; 428/450; 428/482
(58) Field of Search ................................. 428/332, 337, 428/339, 343, 346, 347, 348, 352, 349, 354, 446, 448, 480, 482, 334, 336, 141, 143, 147

(56) References Cited

U.S. PATENT DOCUMENTS

| 3,322,553 | A | | 5/1967 | Seifried et al. | |
| 4,288,479 | A | * | 9/1981 | Brack | 361/218 |
| 4,517,279 | A | * | 5/1985 | Worns | 430/281.1 |
| 4,571,363 | A | | 2/1986 | Culbertson et al. | |
| 4,689,290 | A | * | 8/1987 | Worns | 430/286.1 |
| 4,898,850 | A | * | 2/1990 | Igata et al. | 503/227 |
| 5,011,803 | A | | 4/1991 | Park et al. | |
| 5,096,784 | A | | 3/1992 | Culbertson et al. | |
| 5,114,739 | A | | 5/1992 | Culbertson et al. | |
| 5,302,459 | A | * | 4/1994 | Kim et al. | 428/447 |
| 5,350,601 | A | | 9/1994 | Culbertson et al. | |
| 5,482,780 | A | | 1/1996 | Wilkie et al. | |
| 5,489,473 | A | | 2/1996 | Wilkie | |
| 5,496,685 | A | * | 3/1996 | Farber et al. | 430/281.1 |
| 5,520,994 | A | * | 5/1996 | Kayama | 428/215 |
| 5,548,017 | A | * | 8/1996 | DiStefano | 524/514 |
| 5,672,428 | A | | 9/1997 | Muschelweicz et al. | |
| 5,720,839 | A | * | 2/1998 | Takahashi et al. | 156/230 |
| 5,792,549 | A | | 8/1998 | Wilkie | |
| 5,798,174 | A | | 8/1998 | Wilkie | |
| 5,981,047 | A | * | 11/1999 | Wilkie | 428/215 |
| 6,020,412 | A | * | 2/2000 | Muschelewicz et al. | 524/296 |
| 6,024,895 | A | * | 2/2000 | Shimizu et al. | 252/500 |
| 6,225,194 | B1 | * | 5/2001 | Noguchi et al. | 438/464 |
| 6,245,382 | B1 | * | 6/2001 | Shvartsman et al. | 427/208.2 |

FOREIGN PATENT DOCUMENTS

| EP | 0 527 080 A | 2/1993 |
| EP | 0 789 281 A | 8/1997 |
| GB | 1411564 | 10/1975 |
| JP | 53 025654 A | 3/1978 |
| JP | 53 031739 A | 3/1978 |
| JP | 05 065461 A | 3/1993 |

OTHER PUBLICATIONS

European Search Report, Examiner: Schmidt, Nov. 21, 2001.

* cited by examiner

Primary Examiner—James J. Seidleck
Assistant Examiner—Travis B Ribar

(57) ABSTRACT

The present invention provides a coated polymer film having release properties. The film includes a self-supporting polymer film layer, and a release coating on the film layer. The release coating, which can also be applied to alternate substrates, includes a cross-linkable acrylic and a polyolefin wax. The coating can optionally include a polysiloxane in combination with one or both of the acrylic and polyolefin wax.

50 Claims, No Drawings

RELEASE COATED POLYMER FILM

This application claims priority in Provisional Appication Serial No. 60/230,652. filed on Sep. 7, 2000 and U.S. Provisional Application Serial No. 60/249,605 filed on Nov. 17, 2000.

BACKGROUND OF THE INVENTION

1. Field of the Invention

The present invention relates generally to a method for creating a release product by means of coating a polyester film with a release coating containing a polyolefinic wax and a cross-linkable acrylic. The polyester-compatible release coating and coated film are also disclosed.

2. Description of Related Art

Release films are desirable for many applications. Silicone-coated polymer films are well known and commercially available for use as release films. These release films are often used as backer sheets for adhesive-coated stock, including labels, pressure sensitive tapes, decorative laminates, transfer tapes and the like. The adhesive easily releases from such surfaces with minimal force. Release coatings can also be used in contact with food items, to prevent sticking and to promote release of all of the food from the surface of the film.

Cold seal adhesives are desirable for many applications. These adhesives are capable of bonding to themselves under pressure at ambient temperatures. Typically, cold seal adhesives are used where the item being packaged is heat sensitive. Examples of such heat sensitive items are food items, such as candy. Many non-food items are also heat sensitive and preferably contain or are packaged using cold seal adhesives. Frequently, the packaging material used in conjunction with cold seal adhesives is a film substrate, to which a cold seal adhesive can be applied. Film bearing a cold seal adhesive is usually wound into a roll by the manufacturer or converter before being formed into a package and filled. However, the cold seal adhesive will tend to bond to the opposite side of the wound roll during storage unless a separate layer having cold seal release properties is placed between the front and back faces, or unless the opposite side itself has cold seal release properties.

Cold seal packaging films known in the market are polyolefin based. Biaxially oriented polypropylene film is commercially available as a cold seal film. Migrating additives and propylene-based coatings have been disclosed for use on the face of the polypropylene film opposite the face bearing the cold seal adhesive. These additives and coatings are intended to provide a cold seal release capability to the film to prevent adhesion of the rolled layers. However, these additives and coatings have been adapted for use on polypropylene film. Their compatibility with or suitability for use on polyester film has not been established.

Release film is also used in the capacitor industry. Capacitors are typically coated with a ceramic-type coating during manufacture. This coating must later release from the substrate to permit use in the finished capacitor. Many other uses of release film are contemplated. For example, release films are commonly used as protective coatings on building products such as plastic or metal sheets or formed items, such as window films, faucets, decorative hardware and the like. Such films also are used to protect automobile finishes during transport.

In addition, polyester film coatings containing cross-linkable acrylics or polyolefin waxes are known. However the combination of the two, and their surprising release properties when combined, are not disclosed in the art.

BRIEF SUMMARY OF THE INVENTION

Accordingly, it is an object of the present invention to provide a release coating suitable for application to a base polyester film.

It is a further object of the present invention to provide a release surface having a release force of less than about 100 grams per inch (about 40 grams per cm), preferably for cold seal adhesive release.

It is another object of the present invention to provide a release surface having low haze.

It is a further object of the present invention to have a release coating suitable for use with cold seal adhesives.

It is a further object of the present invention to have little to no adhesive deadening or reduction in adhesive properties due to the transfer of the release coating.

It is a further object of the present invention to have little to no adhesive transfer to the release surface.

It is a further object of the present invention to provide a reclaimable polyester film having cold seal release properties.

It is another object of the present invention to provide a release surface suitable for use with ceramic coated capacitors.

It is a further object of the present invention to achieve a coefficient of friction in the range of about 0.20 to about 0.35.

It is a further object of the present invention to achieve a surface energy level of about 15 to about 40 dynes/cm.

The present invention has accomplished these objectives by providing in a preferred embodiment a coated polymer film having a release coating including a cross-linkable acrylic and a polyolefin wax, the coating used therewith, and the method of applying such coating to film.

DETAILED DESCRIPTION OF THE INVENTION

The present inventors have surprisingly found that excellent release properties are provided by a coating that includes a polyolefin wax and a cross-linkable acrylic.

The release coating of the present invention preferably includes a polyolefin wax. Without intending to be bound by theory, it is believed that the polyolefin wax acts to provide the proper degree of release properties to the film in relation to the cold seal adhesives. Preferred waxes include polypropylene and polyethylene waxes, either alone or in combination. An oxidized homopolymer of ethylene wax commercially available from Michelman as ME18325 wax is most preferred for use herein, in part due to the fact that it does not yellow during the reclamation process. Polytetrafluoroethylene wax is also preferred for use herein, alone or in combination with other waxes. Other waxes such as carnauba, paraffin, montan and combinations of the foregoing may be combined with the polyolefin wax if desired, or used without the polyolefin wax.

The polyolefin wax is preferably present at about 0.05 to about 15 percent by weight of the coating solution, and in an alternate preferred embodiment, it is present at about 1 to about 4 percent by weight of the coating solution. Optimally, the wax is present at about 2 to about 3 percent by weight of the coating solution.

It is also preferred that the release coating of the present invention include a cross-linkable acrylic. Without intending to be bound by theory, it is believed that the cross-linkable acrylic forms three-dimensional nodules on the surface of the film, thus texturing it and controlling the coefficient of friction of the resulting surface. Preferred cross-linkable acrylics include methacrylate-based polymers, including those described in U.S. Pat. Nos. 5,096,784 and 5,114,739 to Culbertson et al. (commonly assigned), the disclosures of which are incorporated herein by reference. Preferably, the cross-linkable acrylic includes methylmethacrylate, ethyl acrylate, N-methylol acrylamide, methacrylamide, external crosslinking agents such as melamines, aziridines and the like, or combinations of the foregoing. As described in the '784 patent, a preferred acrylic terpolymer comprises 80 mole percent methyl methacrylate, 15 mole percent ethyl acrylate and 5 mole percent N-methylol acrylamide, with 0.2 percent by weight sodium lauryl sulfate and 5.0 percent by weight octylphenol ethoxylate. Thus surfactants are also preferably included in the compositions of the present invention.

The cross-linkable acrylic is preferably present at about 0.05 to about 5 percent by weight of the coating solution, and in an alternate preferred embodiment, it is present at about 0.2 to about 0.3 percent by weight of the coating solution. It is believed that other polymeric binders will also function with or in place of the cross-linkable acrylic. Optimally, the cross-linkable acrylic is present at about 0.25 percent by weight of the coating solution.

A resulting wax to acrylic ratio of about 1:1 to about 30:1 is preferred, and in an alternate preferred embodiment it is present at a ratio of about 5:1 to about 15:1. More specifically, for cold seal release applications, a wax to acrylic ratio of about 7:1 to 12:1 is more preferred, alternatively about 10:1. For ceramic capacitor release, a ratio of about 25:1 to about 60:1 is more preferred, alternatively about 40:1.

It has surprisingly been found that the addition of a silicone to the compositions of the present invention, can give beneficial results. Thus, in a preferred embodiment, the compositions of the present invention include a silicone component in addition to the polyolefin wax and/or cross-linkable acrylic. A preferred polysiloxane for use in the present invention is a pendent vinyl polysiloxane, more preferably an alkylvinylpolysiloxane containing vinyl groups, such as the methyl vinyl polysiloxane/platinum composition commercially available from Wacker Silicones as 400E Dehesive. Dimethylvinylpolysiloxane is alternately preferred. Platinum and tin complex catalysts, and mixtures thereof, are also preferably included. A crosslinker, preferably a crosslinkable hydride polysiloxane, is also included. For example, a crosslinker commercially available from Wacker Silicones as V-72 crosslinker is also included. A weight percent ratio of about 10:1 silicone to crosslinker is preferably used.

Other aqueous based silicone resin compositions that may be used in the present invention include: 1) Dow Corning Syl-off X2-7720, 7900, or 7910—aqueous silicone resin compositions comprising methyl vinyl polysiloxane and methyl hydrogen polysiloxane with either the X2-7721 or 7922 crosslinking system comprising platinum polysiloxane; 2) GE Silicones SM3200 aqueous silicone resin composition comprising methyl vinyl polysiloxane and methyl hydrogen polysiloxane with the 3010 crosslinking system comprising platinum polysiloxane; and 3) PCL PC-105, PC-107 or PC-188 (Rhone-Poulenc Inc.) aqueous based silicone resin compositions comprising methyl vinyl polysiloxane and methyl hydrogen polysiloxane with the catalyst component of PC-95 comprising platinum polysiloxane. The disclosure of U.S. Pat. No. 5,672,428 is incorporated herein by reference with regard to its teaching of useful polysiloxanes.

A silane may optionally be included. Preferably a glycidoxy silane is used, more preferably a glycidoxypropyltrimethoxysilane, such as the one commercially available as Dow Corning Z-6040® glycidoxypropyltrimethoxysilane.

The silicone is preferably present at up to about 8 percent by weight of the coating solution, and in an alternate preferred embodiment, it is present at about 0.5 to about 2 percent by weight of the coating solution. Optimally, the silicone is present at about 1 percent by weight of the coating solution. Greater amounts of silicone may be used for various applications. For ceramic capacitor release sheets, however, at a level of about 3 weight percent silicone, wet out of the ceramic coating declines.

Cross-linking of the acrylic typically occurs during heat setting in the manufacture of the in-line coated film, or in a separate heat setting step during off-line coating. Temperatures of about 190 to about 240 degrees Celsius are preferred for such heat setting.

The ingredients of the release coating are preferably formulated as a dispersion in water or a water-containing solvent. Alternatively, alcohols or other suitable organic solvents can be employed, alone or in combination with water. The solids level is preferably up to about 10 weight percent, alternatively about 0.1 to about 7 weight percent, more preferably about 1 to about 4 weight percent of the coating.

Conventional additives that are known in the art can be included in the release coatings of the present invention. For example, pigments, other colorants, stabilizers, antistatic agents, adhesion promoters, slip agents, surfactants, antioxidants, delusterants, fillers, plasticizers and the like can be included in the release coatings of the present invention. In a preferred embodiment, a silica such as the one commercially available as Nalcoag colloidal silicas could be added to the coatings of the present invention as a slip agent. However, the textured nature of the acrylic component provides slip, making it possible to omit separate slip additives yet achieve excellent processability.

The preferred solids level of the release coating, as it is applied to the base polyester film, is a level sufficient to yield a final dry coating thickness within the range of about 0.0004 microns to about 0.06 microns, alternatively about 0.005 microns to about 0.018 microns.

The coating compositions of the present invention can be formulated by simply combining the desired coating components. Agitation may be used to insure an even dispersion or solution.

The coefficient of friction that results from the release coating of the present invention is preferably about 0.2 to about 0.3, alternatively about 0.2 to about 0.5. Coefficients of friction significantly below this range are viable, but may require processing alternations to handle the coated film reliably.

The release force of the coated polyester films of the present invention from adhesives such as cold seal adhesives is preferably less than about 100 grams per inch (about 40 grams per cm). More preferably, a release force of less than about 80 grams per inch (about 30 grams per cm) is achieved, or alternatively from about 20 to about 60 grams per inch (about 8 to about 24 grams per cm).

An important attribute of a cold seal or other adhesive release film is resistance to deadening effect—the transfer of the release coating to the adhesive, which reduces the effectiveness of the adhesive. Clearly, it is important that when the release film is used in adhesive release applications, it have either essentially no or a low deadening effect such that the adhesive will have consistent and unimpaired performance after contact with the release coating.

This release coating is optimal for use with cold seal adhesives (also referred to as cohesives) containing natural or synthetic rubber latex compounds, or combinations thereof. Most preferably, the cold seal adhesive coating commercially available as C1099 from Bostik Findley is used in conjunction with the cold seal release coating of the present invention. Water-based adhesive coatings are preferred. Cold seal adhesives, when applied to the cold seal receptive surface of a flexible packaging substrate, allow the package to be cohesively sealed by pressure and adequate dwell time at ambient temperatures. Cold seal generally means the sealing or bonding of two film layers (or a film layer and another substrate) to each other at less than about 150 degrees F. (about 65 degrees C.).

The release coating is preferably coated on treated or untreated film. Corona treatment is preferably used to enhance coating adhesion. Chemical primers may also be used.

The release coatings of the present invention are useful in many applications in which silicone release coatings would be used. However, the release coatings of the present invention need not contain silicone, and consequently can provide operating freedom from silicone contamination, which would be desirable in many applications. Alternatively, those embodiments of the present invention that do contain silicones contain lesser amounts of silicone. For example, the release coatings of the present invention are useful in thermal lamination film for use with a hot shoe laminator. When the coated film surface is dragged over the hot shoe (a stationary roll), the release coating prevents excessive scratching of the film surface. Alternatively, cover sheets for photoresist (traditionally polyethylene film) or cover sheets for flexographic printing plates can be fabricated from polyester or other polymer film coated with the release coatings of the present invention. An additional preferred use of the coated release films of the present invention is as a release sheet for ceramic capacitors. All of these applications require a preferential or controlled release so the cover or other release sheet can be removed with the proper force.

When used in conjunction with ceramic capacitors, it is preferred that the ceramic capacitor coating include elements such as those discussed in U.S. Pat. No. 5,011,803 to Park et al., the disclosure of which is incorporated herein by reference.

The coatings of the present invention have surprisingly been found to have the appropriate dyne levels to permit proper wet out of the ceramic capacitor coating. This is in addition to the excellent release properties it demonstrates, which allow subsequent separation of the dried ceramic coating from the polymer film substrate. Surface energy levels of about 27 to about 33 dynes/cm are preferred. Alternatively, dyne levels of about 15 to about 40 dynes/cm are preferred. Dynes levels of about 15 to about 20 are readily achieved by coatings of the present invention containing silicone. This results in a comparable release to known polypropylene release films.

The positive reclaim (absence of excessive yellowing or deterioration in physical properties when coated film scrap is mixed with fresh polymer and re-extruded) and recycling characteristics of coated polymer film are important. The ability to reuse scrap film, instead of disposing of it, reduces material and waste disposal costs and minimizes unnecessary waste. The silicone-free coatings of the present invention can avoid silicone contamination issues caused by reclaim of silicone-containing coatings. They are highly acceptable for reclaim.

Haze of the coated film is also significant for aesthetic purposes. A hazy film is often less desirable for packaging and other end uses. The coated films of the present invention preferably have a haze of less than about 10%, more preferably less than about 5%, e.g., for a 0.5 mil (12 micron) film.

Base Film

For many preferred uses of the coatings and methods of the present invention, a polyester film substrate is most useful. It provides a lightweight, substantially transparent, inexpensive, disposable or recyclable substrate. The coatings of the present invention have been developed for their affinity to and compatibility with polyester films. In addition, the coated polyester film can also easily be laminated by heat bonding or by adhesives to various other substrates, separate and apart from its ability to bear the release coatings of the present invention.

However, the release coatings and coating methods of the present invention are applicable to any polymeric film capable of acting as a substrate for a release coating. For example, the present invention is applicable to polymeric films such as those made from polyamides exemplified by nylon; polyolefins such as polypropylene and polyethylene; polyester such as polyethylene terephthalate; polyacetal; polycarbonate; and the like. The invention is particularly applicable to polyester, most preferably polyethylene terephthalate, polyethylene naphthalate or polybutylene terephthalate. The present invention is also applicable to polymeric films including copolyesters such as polyethylene terephthalate isophthalate. A preferred process for forming a base film is set forth in U.S. Pat. No. 5,350,601 to Culbertson et al., incorporated herein by reference. Generally, any polyester film based on a polymer resulting from polycondensation of a glycol or diol with a dicarboxylic acid (or its ester equivalents) such as terephthalic acid, isophthalic acid, sebacic acid, malonic, adipic, azelaic, glutaric, suberic, succinic acids and the like, of mixtures of two or more of the foregoing, are preferred for use in the present invention. Suitable glycols include ethylene glycol, diethylene glycol, polyethylene glycol, and polyols such as butanediol and the like. Mixtures of two or more of the foregoing are also suitable.

Any of the above base polymer films can contain conventional additives such as antioxidants, delusterants, pigments, fillers such as silica, calcium carbonate, kaolin, titanium dioxide, antistatic agents and the like, or mixtures thereof, all of which are well known in the art.

In addition, the base polymer film may be a polymer laminate or coextrusion. Such laminates include polymer-polymer laminates like polyester-polyolefin or polyester-adhesive-polyolefin, polymer-metallic laminates such as polyester-aluminum, or polymer-paper or polymer-adhesive-paper laminates. Coated polymer films or film laminates can also be used. Primer coatings used to enhance wet-out or coating adhesion are preferred examples of such coatings.

The films may be produced by any well known technique in the art. For example, polyester is typically melted and extruded as an amorphous sheet onto a polished revolving casting drum to form a cast sheet of the polymer. The sheet is quickly cooled and then stretch oriented in one or more directions to impart strength and toughness to the film. The sheet is typically stretched from about two to about four times the original cast sheet dimension, in one or both directions. Biaxial orientation is most preferred, with mono-axial orientation being less preferred. Generally, stretching occurs in a temperature range from about the second order transition temperature of the polymer to below the temperature at which the polymer softens and melts. Where necessary, the film is heat treated after stretching to "lock-in" the properties by further crystallizing the film. The crystallization imparts stability and good tensile properties to the film. Such heat treatment for polyester film is generally conducted at about 190° C. to about 240° C.

Alternate Substrates

As discussed above, the coatings and methods of providing a release film of the present invention are not limited to use on polymer film bases. Alternate substrates such as metals, glass, polymeric articles and the like can be coated according to the teachings of the present invention. Furthermore, it is envisioned that polymer films coated with the coatings of the present invention can also be applied to other surfaces, including irregular surfaces, to provide release properties to those surfaces. The film may be heat bonded or adhered to the surface, or can be mechanically attached via fasteners, clips and the like.

Coating Methods

In-line coating of the base polymer layer, in which the coatings are applied during the film manufacturing process and before it is heat-set, is the preferred method for use of the coatings disclosed herein. Typically, the base polymer film is coated after corona treatment and prior to the stretch orientation of the film as described in British Patent No. 1,411,564, or coated between drawing steps (when biaxially oriented film is produced) as taught by U.S. Pat. No. 4,571,363, or coated post-draw as taught by U.S. Pat. No. 3,322,553.

In addition to in-line coating, one or more of the coatings of the present invention may be off-line coated (after manufacturing and heat setting the film), preferably after conventional surface modification of the polymeric substrate has occurred. Thus, the coating and method of the present invention are also intended for use where, for example, the base polymer film is produced and later coated off-line with one or more coatings of the present invention. Alternatively, one or more coatings can be applied in-line, with the remainder being applied off-line. Conventional off-line coating processes include roll coating, reverse roll coating, gravure roll coating, reverse gravure roll coating, brush coating, wire-wound rod (Meyer rod) coating, spray coating, air knife coating, meniscus coating or dipping.

While surface modification of the base polymer film prior to coating is not required, it has been found that better results are obtained if the surface or surfaces of the base polymer film are modified before application of the coatings of the present invention. Conventional surface modification techniques include corona treatment, which is the most common and most preferred procedure for modifying the surface of the polymer base film to enhance coating adhesion. The corona treatment or other surface modification should be sufficient to permit wetting out of the coating. Corona treatment of about 1.0 watt per square foot per minute is typically sufficient to achieve the desired results. In addition, primer or other intermediate layers can optionally be used between the polymer film and the release coating.

In light of the foregoing, a preferred method of providing a release surface on polymer film is provided herein. Preferably, one or both faces of a base polymer film are coated with a release coating of the present invention. Optionally, if only one face is coated with the release coating of the present invention, this coating can occur before, after or at the same time the opposite face of the base polymer film is coated with an alternate coating. The release coating is preferably not overcoated with another coating. Such a top coating could limit the performance of the release coating. The release coatings of the present invention can be borne on a separate film or surface from the substance to be released (e.g., adhesive, metal hardware or ceramic). Alternatively, the release coatings can be applied to an opposite face of the same film on which the substance to be released is carried. In a further preferred embodiment, the substance to be released can be applied directly to the release coated surface, and subsequently removed.

EXAMPLES

The following Examples demonstrate various aspects of certain preferred embodiments of the present invention, and are not to be construed as limitations thereof. The formulations of the individual samples are shown in the charts below. In each example, the listed release coating samples were formulated and coated in-line onto polyester film which was subsequently heat set.

Example Series A

For the following Example series, cold seal release force is tested as follows:

Laboratory drawdowns of cold seal adhesive film were prepared using an acrylic coated film (Hostaphan® 2CSR). A no. 7 Meyer rod (wire wound) was used to apply Bostik Findley C1099 cold seal adhesive to this film at 3.0–3.5 pounds per 3000 square feet. The samples were dried thoroughly at 140° F. for 45 seconds. The cold seal adhesive samples were then covered with the release side of the test film (see sample descriptions below) and of a control film. The test films were 36 micron film (142 gauge), except sample 13B which was 12 micron (48 gauge) film. The control film was AFT Films RLS (this film is described as a transparent, non-sealing, slip-modified, coextruded, biaxially oriented polypropylene (OPP) film).

Three tests were done on each sample:

1. Oven blocking test at 100 psi, 16 hours, 50° C. (122° F.)—per description above
2. Room temperature test at 100 psi, 16 hours, 22–24° C. (72–75° F.)—per description above
3. Tape adhesion test (a strip of 3M Scotch® 810 tape is adhered to the release coated polyester film. The strip is rubbed with a finger to insure intimate contact and then removed by a TLMI Release and Adhesion Tester. This instrument measures the force (in grams/inch) needed to remove the tape from the release film. The tape is pulled in a 180 degree configuration and at a speed of 12 inches per minute. While this tape is not a cold seal adhesive tape, its release results have been shown to have a direct correlation to cold seal adhesive release performance)

The cold seal adhesive coated samples from the blocking test were then sealed to determine if there was any effect on sealability and the seal strength after coating had been blocked to the test films.

Description of the Samples

The acrylic used is a methyl methacrylate/ethyl acrylate/N-methylol acrylamide copolymer. The wax used is an oxidized homopolymer of ethylene commercially available as ME18325 from Michelman.

| Sample (36 micron film) | Acrylic Component (%) | Wax Component (%) | Wax/Acrylic Ratio |
|---|---|---|---|
| 5 | 0.2 | 2.0 | 10 |
| 7 | 0.3 | 2.0 | 6.7 |
| 8 | 0.1 | 3.0 | 30 |
| 9 | 0.2 | 3.0 | 15 |
| 10 | 0.3 | 3.0 | 10 |
| 13A | 0.255 | 2.545 | 10 |
| 13B (12 micron film sample) | 0.255 | 2.545 | 10 |

Blocking Test Results

| Sample Tested | Room Temperature Results | Oven Temperature Results | 810 Tape Results (g/in) |
|---|---|---|---|
| COMP EX. RLS Control | 3 | 4 | N/A |
| 5 | 2 | 3 | 131 |
| 7 | 2 | 5 | 140 |
| 8 | 2 | 4 | 126 |
| 9 | 3 | 1 | 110 |
| 10 | 2 | 3 | 116 |
| 13A | 2 | 2 | 102 |
| 13B (12 micron film thickness) | 1 | 1 | 100 |

Room Temperature: Graded from 3 to 1, with 3 demonstrating very slight cling comparable to the RLS comparative example, 2 demonstrating very, very slight cling, and 1 demonstrating very, very, very slight cling.

Oven Temperature: Graded from 5 to 1, with 5 demonstrating strong cling and 1 demonstrating slight cling. A rating of 4 is comparable to the RLS comparative example, with a force of about 25 to 30 grams per inch.

A post-blocking adhesive deadening test was run on all samples. These tests showed no differences between the samples tested. All were acceptable and comparable to the control, both for room temperature and oven temperature results. All of the tested samples provided good and controlled release from the cold seal adhesive. No adhesive deadening was noted, demonstrating excellent and consistent resistance to release coat transfer.

Example Series B

In this example series, the release from ceramic coatings (such as are used in the manufacture of capacitors) was tested. The ceramic coating was applied by Meyer rod to the release film.

| No. | Formulation | Wax/Acrylic Ratio | Solids Level (weight %) | Ceramic Coating Thickness (mils) | Coated Film Dyne Level (dynes/cm) | Release |
|---|---|---|---|---|---|---|
| 45-01 | 2.29% wax, 0.46% acrylic | 5.00 | 2.75 | 1.75 | 31.12 | 4 |
| 45-01 | 2.29% wax, 0.46% acrylic | 5.00 | 2.75 | 1.88 | 31.12 | 4 |
| 45-02 | 2.5% wax, 0.25% acrylic | 10.00 | 2.75 | 1.87 | 32.40 | 3 |
| 45-02 | 2.5% wax, 0.25% acrylic | 10.00 | 2.75 | 1.9 | 32.40 | 3 |
| 45-03 | 2.58% wax, 0.17% acrylic | 15.00 | 2.75 | 1.9 | 32.91 | 3 |
| 45-03 | 2.58% wax, 0.17% acrylic | 15.00 | 2.75 | 2.07 | 32.91 | 3 |
| 45-04 | 2.62% wax, 0.13% acrylic | 20.00 | 2.75 | 1.56 | 30.14 | 2 |
| 45-04 | 2.62% wax, 0.13% acrylic | 20.00 | 2.75 | 1.76 | 30.14 | 2 |
| 45-05 | 5% wax, 0.5% acrylic | 10.00 | 5.50 | 1.75 | 30.56 | 2 |
| 45-05 | 5% wax, 0.5% acrylic | 10.00 | 5.50 | 1.75 | 30.56 | 3 |
| 45-06 | 9.17% wax, 1.83% acrylic | 5.00 | 11.00 | 1.52 | 31.39 | 4 |
| 45-06 | 9.17% wax, 1.83% acrylic | 5.00 | 11.00 | 1.58 | 31.39 | 5 |
| 45-07 | 10% wax, 1% acrylic | 10.00 | 11.00 | 1.76 | 29.57 | 4 |
| 45-07 | 10% wax, 1% acrylic | 10.00 | 11.00 | 2.02 | 29.57 | 4 |
| 45-08 | 10.48% wax, 0.52% acrylic | 20.00 | 11.00 | 1.96 | 28.69 | 4 |
| 45-08 | 10.48% wax, 0.52% acrylic | 20.00 | 11.00 | 1.87 | 28.69 | 4 |
| 45-8A | 3% wax; 0.1% acrylic | 30.00 | 3.10 | 1.84 | 29.08 | 2 |
| 45-8A | 3% wax; 0.1% acrylic | 30.00 | 3.10 | 2.16 | 29.08 | 2 |
| COMP 45-09 | Silicone-coated* | N/A | N/A | N/A | no coating wetout | |
| COMP 45-10 | Silicone-coated* | N/A | N/A | N/A | no coating wetout | |
| 24-01 | 1.0% wax, 0.1% acrylic | 10.00 | 1.10 | 1.94 | 40.95 | 5 |

-continued

| No. | Formulation | Wax/ Acrylic Ratio | Solids Level (weight %) | Ceramic Coating Thickness (mils) | Coated Film Dyne Level (dynes/cm) | Release |
|---|---|---|---|---|---|---|
| 24-02 | 1.0% wax, 0.2% acrylic | 5.00 | 1.20 | 1.72 | 31.05 | 4 |
| 24-03 | 1.0% wax, 0.3% acrylic | 3.33 | 1.30 | 1.95 | 33.19 | 4 |
| 24-04 | 2.0% wax, 0.1% acrylic | 20.00 | 2.10 | 1.85 | 34.68 | 4 |
| 24-05 | 2.0% wax, 0.2% acrylic | 10.00 | 2.20 | 1.65 | 43.99 | 5 |
| 24-06 | 2.0% wax, 0.2% acrylic | 10.00 | 2.20 | 1.28 | 31.75 | 3 |
| 24-07 | 2.0% wax, 0.3% acrylic | 6.67 | 2.30 | 1.71 | 44.25 | 3 |
| 24-08 | 3.0% wax, 0.1% acrylic | 30.00 | 3.10 | 1.31 | 36.96 | 3 |
| 24-09 | 3.0% wax, 0.2% acrylic | 15.00 | 3.20 | 1.69 | 37.71 | 4 |
| 24-10 | 3.0% wax, 0.3% acrylic | 10.00 | 3.30 | 1.45 | 40.38 | 2 |
| 83-01 | 1.591% wax, 0.909% acrylic | 1.75 | 2.50 | 1.75 | 33.74 | 4 |
| 83-02 | 0.333% wax, 0.667% acrylic | 0.50 | 1.00 | 1.71 | 37.98 | 5 |
| 83-03 | 0.75% wax, 0.25% acrylic | 3.00 | 1.00 | 0.99 | 32.84 | 3 |
| 83-04 | 1.333% wax, 2.667% acrylic | 0.50 | 4.00 | 0.89 | 37.90 | 5 |
| 83-05 | 3% wax, 1% acrylic | 3.00 | 4.00 | 1.72 | 32.53 | 4 |
| 83-06 | 0.833% wax, 1.667% acrylic | 0.50 | 2.50 | 1.3 | 37.57 | 5 |
| 83-07 | 1.875% wax, 0.625% acrylic | 3.00 | 2.50 | 1.79 | 32.62 | 4 |
| 83-08 | 0.636% wax, 0.364% acrylic | 1.75 | 1.00 | 1.81 | 34.22 | 5 |
| 83-09 | 2.545% wax, 1.455% acrylic | 1.75 | 4.00 | 1.73 | 32.29 | 4 |
| 83-10 | 1.591% wax, 0.909% acrylic | 1.75 | 2.50 | 1.89 | 30.51 | 4 |
| 83-11 | 0.75% wax, 0.25% acrylic | 3.00 | 1.00 | 1.85 | 25.95 | 4 |
| 83-12 | 0.333% wax, 0.667% acrylic | 0.50 | 1.00 | 1.66 | 36.86 | 5 |
| 83-13 | 2.545% wax, 0.25% acrylic | 10.20 | 2.80 | 1.78 | 26.83 | 2 |
| 83-14 | 2.545% wax, 1.455% acrylic | 1.75 | 4.00 | 1.87 | 31.46 | 4 |
| 83-15 | 0.333% wax, 2.667% acrylic | 0.13 | 3.00 | 1.91 | 41.80 | 5 |
| 83-16 | 1.333% wax, 2.667% acrylic | 0.50 | 4.00 | 1.87 | 38.00 | 5 |
| 83-17 | 1.455% wax, 1.455% acrylic | 1.00 | 2.90 | 1.81 | 39.60 | 5 |

*Note:
These comparative examples are conventional silicone coatings that do not contain textured acrylic or polyolefin wax), not the silicone-containing embodiments of the present invention Release Numbers were assigned in a range of 1 (best release) to 5 (not acceptable for this application)

5=Meyer rod marks present and spots and residue of coating left on substrate; functional but cosmetically less desirable (the Meyer rod marks are believed to be an artifact of the ceramic coating process)

4=Meyer rod marks present; functional but cosmetically less desirable

3=No Meyer rod marks present or residue on substrate

2=No marks or residue and coating continues to peel slightly after tape is no longer in contact with it 1=No marks or residue and coating continues to peel even without contact with tape as a uniform film From a review of these samples, it appears that a high wax to acrylic ratio is preferable. A greater than 10:1 ratio is preferred, with ratios of about 25:1 to about 60:1 being more preferred. Lower total solids level coatings appear to have better release performance. Comparative tests run on commercially available copolyester and silicone-based coatings showed no wet down or poor release. See Comparative Examples 45–09 and 45–10, above. The ceramic coating does not wet out on the comparative silicone-based coatings, as seen in the table above.

Example Series C

| No. | Formulation | Ceramic Peel Testing (Sample Average in g/in) | Coated Film Dyne Level (sample average in dynes/cm) |
|---|---|---|---|
| 88-8 | 3% wax; 0.1% acrylic; 3% Silicone* | 4.00 | 17.69 |
| 88-9 | 3% wax; 0.1% acrylic; 1% Silicone* | 7.10 | 17.85 |
| Control | Biaxially oriented polypropylene | 6.90 | 19.51 |
| 88-1 | 3% wax; 0.1% acrylic | 17.40 | 28.96 |
| 88-2 | 24.22% wax; 0.84% acrylic | 127.50 | 25.75 |
| 88-3 | 12% wax; 0.4% acrylic | 23.80 | 27.96 |

*Silicone is a mixture of 10 parts Wacker 400E Dehesive and 1 part V-72 crosslinker and 0.5 parts Z-6040 silane.

The present invention having been thus described with particular reference to the preferred forms and embodiments thereof, it will be obvious to one of ordinary skill in the art that various changes and modifications may be made therein without departing from the spirit and scope of the invention as defined in the appended claims.

What is claimed is:

1. A release film, comprising:
a base polymer film;

a release coating on said base polymer film, wherein said coating includes a cross-linked acrylic and a polyolefin wax, with a ratio of said polyolefin wax to said cross-linked acrylic of about 1:1 to about 30:1.

2. The release film of claim 1, having a dry coating thickness of about 0.0004 to about 0.06 microns.

3. The release film of claim 1, wherein said coating has a coefficient of friction of about 0.15 to about 0.4.

4. The release film of claim 1, wherein said coating has a coefficient of friction of about 0.2 to about 0.35.

5. The release film of claim 1, wherein said coating has a release force of less than about 100 grams per inch.

6. The release film of claim 1, wherein said coating has a release force of less than about 80 grams per inch.

7. The release film of claims 1, wherein said coating has a release force of about 20 to about 60 grams per inch.

8. The release film of claim 1, wherein said base polymer film has said coating on a first face and a cold seal adhesive on a second face.

9. The release film of claim 8, wherein said cold seal adhesive includes a natural or synthetic latex rubber compound.

10. The release film of claim 1, wherein said base polymer film includes polyester.

11. The release film of claim 1, wherein said base polymer film is polyester.

12. The release film of claim 1, wherein said release film has a haze of less than about 5%.

13. The release film of claim 1, wherein said base polymer film is not polypropylene.

14. The release film of claim 1, wherein said coating has a surface energy level of about 20 to about 40 dynes/cm.

15. A method of forming a release film, comprising:
    positioning a base polymer film;
    applying a release coating to said base polymer film, wherein said coating comprises a cross-linkable acrylic and a polyolefin wax, and has a ratio of said polyolefin wax to said cross-linkable acrylic of about 1:1 to about 30:1; and
    cross-linking said cross-linkable acrylic.

16. The method of claim 15, wherein the cross-linking step is performed by heat setting said release polymer film after said coating step at temperatures of about 190 to about 240 degrees Celsius.

17. The method of claim 15, wherein said base polymer film is corona treated prior to said coating step.

18. The method of claim 15, wherein said coating is applied by in-line coating.

19. The method of claim 15, further comprising the step of contacting a ceramic coating to at least a portion of said release film.

20. The method of claim 15, further comprising the step of contacting a cold seal adhesive to at least a portion of said release film.

21. The method of claim 15, wherein said release film is a thermal lamination film.

22. The method of claim 15, wherein said release film is a photoresist cover sheet.

23. The method of claim 15, wherein said release film is a flexographic printing plate cover sheet.

24. The method of claim 15, wherein said release film is a ceramic capacitor release sheet.

25. A method of forming a release film, comprising:
    positioning a base polymer film;
    applying a release coating to said base polymer film, wherein said coating comprise a cross-linkable acrylic and a polyolefin wax, and has a ratio of said polyolefin wax to said cross-linkable of about 25:1 to about 60:1 and cross-linking said cross-linkable acrylic.

26. The method of claim 15, wherein said release film is a protective sheet for a plastic or metal object.

27. The method of claim 15, wherein said release coating comprises:
    water;
    about 0.05 to about 5 weight percent of said cross-linkable acrylic and about 0.05 to about 15 weight percent of said polyolefin wax.

28. The method of claim 15, wherein said release coating is a water-based coating.

29. The release film of claim 1, wherein at least one of said cross-linked acrylic and said polyolefin wax are water dispersible.

30. The release film of claim 1, wherein said coating provides a release surface having a release force of less than about 100 grams per inch.

31. The release film of claim 1, wherein said polyolefin wax is selected from the group consisting of polypropylene, polyethylene, polytetrafluoroethylene and combinations thereof.

32. The release film of claim 31, wherein said polyolefin wax is polypropylene.

33. The release film of claim 31, wherein said polyolefin wax is polyethylene.

34. The release film of claim 31, wherein said polyolefin wax is polytetrafluoroethylene.

35. The release film of claim 31, wherein said polyolefin wax includes an oxidized homopolymer of ethylene.

36. The method of claim 15, wherein said polyolefin wax is present at about 1 to about 4 weight percent.

37. The method of claim 15, wherein said polyolefin wax is present at about 2 to about 3 weight percent.

38. The release film of claim 1, wherein said cross-linked acrylic is selected from the group consisting of methylmethacrylates, ethyl acrylates, N-methylol acrylamides, methacrylamides, melamines, aziridines, and combinations thereof.

39. The release film of claim 1, wherein said cross-linked acrylic includes methylmethacrylate, ethyl acrylate and N-methylol acrylamides.

40. The method of claim 15, wherein said cross-linkable acrylic is present at about 0.05 to about 0.5 weight percent.

41. The method of claim 15, wherein said cross-linkable acrylic is present at about 0.2 to about 0.3 weight percent.

42. The method of claim 15, wherein said coating has a solids level of about 0.1 to about 7 weight percent.

43. The release film of claim 1, wherein said coating is substantially silicone-free.

44. The release film of claim 1, wherein said coating further includes one.

45. The release film of claim 1, wherein said coating further includes a pendent vinyl polysiloxane.

46. The release film of claim 1, wherein said coating further includes a polysiloxane crosslinker.

47. The method of claim 15, wherein said coating further includes a silicone, and said silicone is present at up to about 8 percent by weight.

48. The method of claim 47, wherein said silicone is present at about 0.5 to about 2 percent by weight.

49. The release film of claim 1, having a dry coating thickness of about 0.005 microns to about 0.018 microns.

50. The release film of claim 1, wherein said cross-linked acrylic forms nodules on said polymer film.

* * * * *